Nov. 22, 1960 M. J. MAYFIELD 2,961,325
CERMET BODIES
Filed June 21, 1957
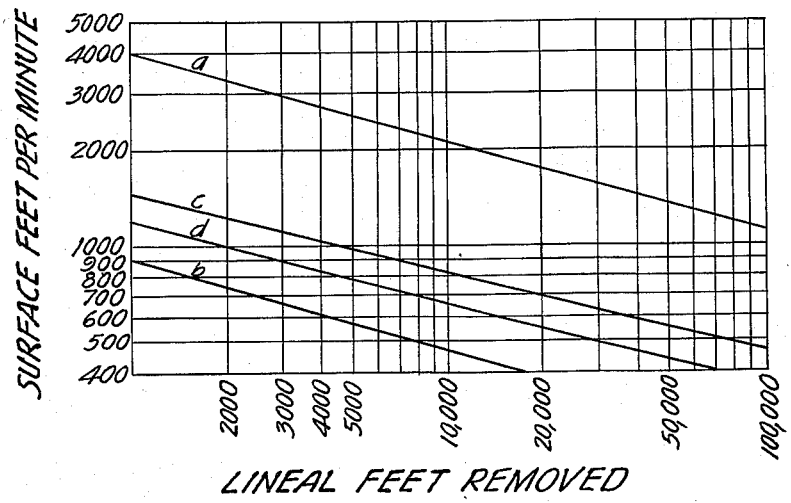
INVENTOR
MANVILLE J. MAYFIELD
Capenter, Abbott, Coulter & Kinney
ATTORNEYS

2,961,325
CERMET BODIES

Manville J. Mayfield, Chattanooga, Tenn., assignor to American Lava Corporation, Chattanooga, Tenn., a corporation of Tennessee Filed June 21, 1957, Ser. No. 667,233

12 Claims. (Cl. 106—39)

This invention relates to cermet bodies and to methods for making the same. More particularly, this invention relates to wear-resistant, dense, hard and tough, cermet cutting tool tip bodies of the alumina type.

"Cermet" is a term used to designate a relatively new field of technology, the term being derived from the words "ceramic" and "metal." For this specification, "cermet" bodies are defined as bodies which contain some metal distributed through a sintered mass of inorganic oxides.

The fact that cermet bodies contain some metal, as distinguished from metal oxides, might lead one to conclude that they inherently would be inferior to ceramics, which are known to be harder than most metals, for use in certain cutting operations, particularly the cutting of high strength steel. The surprising fact, however, is that a small amount of nickel metal distributed as a discontinuous phase through an alumina-type ceramic, as hereinafter described in detail, gives a body having improved wear life and cutting efficiency over any other cutting tool tip bodies with which I am familiar, including ceramic, cermet and carbide bodies. The improved wear life during which my bodies function efficiently as cutters is illustrated in the graph of the drawing made a part hereof, and will be further explained in connection with a specific example.

A major disadvantage of prior art bodies consisting of alpha alumina has been their ready susceptibility to chipping and fracture. While alumina spinels in such bodies have been suggested, chipping, fracture and excessive wear still has remained a problem. For the most part, they have not been found suitable for industrial cutting operations on hard and tough materials.

For years, many industrial cutting operations have been conducted using metal carbide bodies. Such bodies, however, are not used without accompanying disadvantages. One of the major disadvantages arising from their use is that of "chip-welding." During cutting operations, metal carbide cutting tools tend to become heated. Stock that is cut or shaved from a work piece also becomes heated, and the hot stock tends to fuse or weld to the carbide body, providing a protrusion or lever thereon which interferes with the cutting operation and renders the body susceptible to breakage or fracture. The build up caused by chip welding on a cutting tool pulls off during cutting, and has been noted to tear with it large chunks of the carbide bodies.

The present invention provides hard cutting tool tip bodies which are surprisingly tough and chip resistant, which have improved impact resistance and rupture strength, and which additionally remain essentially free of chip welding during cutting. The bodies of this invention remain at relatively low temperatures during high speed cutting operations, even though stock cut or shaved from a work piece may become red hot. While I do not wish to be bound by theory, it is my belief that the hardness of my bodies, in combination with their toughness, their property of remaining at a relatively low temperature during high speed cutting operations, and their physico-chemical inertness with respect to hot metal chips, all contribute to their longer wear life and efficient cutting ability during their wear life.

The improved cutting tip bodies hereof are essentially alpha alumina bodies containing certain modifiers. Microscopic analysis of the bodies of my invention indicates that they have a matrix, i.e., an essentially continuous phase or lattice, which is ceramic in nature, and also have a discontinuous metallic phase distributed throughout this matrix. X-ray analysis indicates that the ceramic matrix consists essentially of alpha alumina and spinels of alumina. The alpha alumina crystals form a polycrystalline aggregate within which the metallic phase and spinels of alumina are embedded. Almost all of the alpha alumina crystals in my bodies are in the range of about 3 to 30 microns in size, as estimated by X-ray and microscopic studies, although some few crystals may range up to about 50 microns in size, or even be larger. Preferred bodies hereof which exhibit the greatest improvement in cutting ability and wear life are estimated to contain a great predominance of alpha alumina crystals in the range of 5 to 20 microns. At least approximately 80% of the weight of my bodies consists of alpha alumina crystals, based on X-ray and microscopic studies.

The spinels in my bodies may be characterized by the formula $RO \cdot Al_2O_3$, where R is nickel or a mixture of nickel and a bivalent metal such as magnesium. Insofar as I am aware, these spinels may be inverse spinels, normal spinels, or a mixture of forms. The alpha alumina and spinels of alumina, as well as any very small amounts of other inorganic oxide material in the bodies, constitute the ceramic matrix thereof.

Throughout the ceramic matrix of my body is essentially uniformly distributed a very small but significant quantity of nickel metal in the form of small discrete particles generally occupying interstitial or boundary zones between ceramic crystals. It is emphasized that, contrary to the practice in the art of making carbide tip bodies, where the metal acts as a matrix in which carbide crystals are bonded, the nickel metal in my body appears to be a discontinuous phase and does not form a continuous matrix within which alpha alumina crystals are bonded. Surprisingly, however, noteworthy improvement in the wear life and cutting efficiency of alumina cutting tip bodies is obtained even when a very small amount of nickel metal, i.e., even as little as 0.1 or 0.2% of the weight of the body, is present in isolated islands or points throughout the body. Such a small amount of nickel is obviously totally inadequate to serve as a binder matrix for sintered alpha alumina crystals or other inorganic materials of the body. Yet the presence of a limited amount of nickel metal is essential for the benefits of improved cutting performance to obtain. The nickel metal may fill up structural defects in the body or act as a filler of voids in the body; however, in view of the behavior of nickel in refractory bodies, as hereinafter discussed, such conjecture as to the role it plays is not offered as a full explanation. I have not as yet formulated a satisfactory theory to account for the improved cutting behavior of my bodies in heavy cutting operations.

While the nickel metal imparts noteworthy improvements in cutting efficiency and wear life to alumina bodies, the amount of nickel metal must be maintained at a relatively low level for maximum cutting performance as herein discussed. When the amount of nickel metal is increased above about 7% of the weight of a body, improvements in cutting performance generally tend to fall off and become negligible. A nickel metal content between about 0.4 to 4% of the weight of my bodies has been noted to impart the greatest improvements in cutting efficiency and cutting life.

In addition to nickel metal, my bodies contain some nickel in oxide form, likely in various states of oxidation up to $Ni^{++}$. Nickel oxide in my bodies diffuses into or combines with alumina to form at least some nickel aluminate or nickel spinels of alumina, as determined by X-ray analysis. The total weight of nickel in my bodies, i.e., the combined weight of nickel in the metallic form and in the form of $Ni^{++}$ in my bodies, may account for up to about 10% (calculated as nickel metal) of the weight of the bodies; however, not more than about 7% of the weight of my fired bodies is nickel in its metallic form, remaining nickel content in the bodies being present in some state of oxidation.

Nickel oxide (NiO) is not considered by most ceramists to be an attractive refractory. As distinguished from metal oxides such as for example, cobalt oxide (CoO), the compound nickel oxide (NiO) is readily oxidized to $Ni_2O_3$ at about 400° C. and goes back to NiO at approximately 600° C. These changes in the valence of oxidized nickel are accompanied by changes in volume, the smaller volume being associated with NiO and the smallest volume with reduced nickel metal itself. Additionally, nickel appears unique among divalent ions in spinel-type crystals inasmuch as it shows a tendency to occupy octahedral sites in such spinel-type crystals, whereas other divalent ions such as $Mg^{++}$ and $Co^{++}$ occupy tetrahedral sites in a normal manner. Considering these various factors, it becomes readily apparent that the production of a dense, tough cermet containing both nickel metal and nickel oxide, as here contemplated, is by no means simple to accomplish. Unless controlled conditions are employed, it becomes evident that bodies containing nickel may well be highly porous, weak in strength and readily susceptible to crumbling and fracture, thus being unsuitable for cutting applications as herein discussed.

The bodies of this invention, however, are dense, hard and tough. The density of my bodies is at least about 80% (preferably at least 90%) of their theoretical void-free density as determined by calculation based on analysis of the composition of the body, and assuming, for purposes of the calculation, a theoretical void-free body. In hardness, my bodies have an average macroscopic Rockwell A hardness of at least about 80. While the best measure of toughness as well as other physical properties of my bodies is to be gained by noting their performance in actual cutting operations, the modulus of rupture of one of my preferred bodies, which may give an indication of its strength and toughness, has been found to be about 50,000 p.s.i. This body had a Young's modulus of about $49 \times 10^6$ p.s.i. In the case of some bodies within the scope of my invention, the modulus of rupture has been noted to even exceed 60,000 p.s.i.

In a preferred process for making my bodies, raw materials used to form the bodies are mixed together, usually with a liquid in a pebble mill until the desired degree of fineness and mixture uniformity is obtained, after which the mixture is dried and pressed into articles of the approximate size and shape desired for use, allowing for about 10–20% linear shrinkage, and then subjected to heating and firing conditions. In firing, the bodies are first subjected to a pre-fire temperature of about cone 14. Pre-firing is preferably accomplished in open air, i.e., in an oxidizing atmosphere. For pre-firing, the temperature should be above the temperature at which nickel metal changes in its state of oxidation (i.e., above about 600° C.), and below the temperature at which the bodies mature into a sintered ceramic-like structure. Preferably, pre-firing is conducted at a temperature near but below the temperature at which maturation of the bodies begins to take place, usually about 50–200° C. below this incipient maturing temperature. Then the bodies are fired to maturation; and while temperatures may be used which are just above the temperature at which maturation begins to take place, cone 31 (1680° C.) or slightly above has been found preferable for maturation firing. During maturation, shrinking and readjustment of crystals takes place so that unfilled voids in the bodies are occupied. Additionally, a certain amount of recrystallization of the ceramic phase of the bodies takes place and compact, dense, hard and tough integral sintered bodies result.

When bodies are pre-fired in an oxidizing atmosphere, for example in open air, subsequent full firing to maturation is conducted in a reducing atmosphere such as hydrogen so as to reduce at least some of the oxidized nickel throughout the bodies to nickel metal. The bodies are then cooled gradually to room temperature, keeping them in a reducing atmosphere at least until they have sufficiently cooled to a point where the islets of nickel metal throughout the bodies will not become oxidized upon exposure of the bodies to the atmosphere. If desired, a body might be prepared by using a raw material batch having a compositional analysis characteristic of the final bodies hereof, and fired under vacuum conditions or in inert gas atmospheres using a single step firing cycle.

As an illustration of preferred bodies of my invention and the preferred method for making the same, the following is offered. All parts are given by weight unless otherwise specified. Mix together about 92.2 parts of calcined alpha alumina powder, 2.9 parts of calcined magnesium aluminate ($MgO \cdot Al_2O_3$) powder, 1.9 parts of magnesium fluoride ($MgF_2$) powder (which serves as a fluxing agent), 3 parts of nickel metal powder, and about 80 parts of water for about 36 hours in a pebble mill until the average particle size of the various constituents is on the order of 3–4 microns. About 200 parts of alumina pebbles of a size proportional to the diameter and speed of the mill are suitable to use for this milling step. Fifteen minutes before milling is terminated, add about 7 parts of an emulsion containing about equal parts of microcrystalline wax (or paraffin wax) and water. Then pour the milled slip in containers and allow it to dry.

Next, put the dried slip cakes in a Muller-type mixer where they are quickly reduced to a powdery material. Then, mix in about 10 parts water and continue the mixing operation in the Muller-type mixer. It will be noted that the smearing, rolling, compacting and kneading action of the Muller-type mixer causes the water moistened powdery material of the slip cakes to agglomerate into small granules. Screen the resulting granules to remove granules larger than 30 mesh and below 100 mesh in size, and dry the remaining granules to a moisture content of about 2% by weight. Press these remaining granules into specimen bodies using pressures of about 15,000 to 20,000 p.s.i. Then dry the specimen bodies at 100° C. for about 3 hours, burn the wax binder out at 200° C. for about 2 hours, and then raise them to a temperature of about 250° C. for 1 to 2 hours.

Next pre-fire the specimens in air at cone 14 (about 1390° C.) on a 26 hour firing cycle having about a 3–4 hour soak time at peak temperature in the middle of the firing cycle. The temperature should be gradually raised to the peak temperature and gradually lowered therefrom during this pre-fire cycle.

Then fire the specimens to maturation in a moist hydrogen atmosphere at a temperature slightly above cone 31 (i.e., at about 1710° C.) on a 7–8 hour firing cycle, starting at room temperature, holding the soak or sintering temperature for about 2–3 hours, and then cooling to room temperature.

Based on X-ray and microscopic studies, specimen bodies thus prepared are estimated to contain about 89.5% by weight of alpha alumina crystals, about 2.5% nickel metal, and about 8% of other inorganic constituents consisting essentially of magnesium and nickel spinels of alumina (i.e., MgO·Al₂O₃ and NiO·Al₂O₃). The magnesium and nickel spinels of alumina in these bodies are in solid solution.

Bodies prepared as above have exhibited an average macroscopic Rockwell A hardness of about 89-91 and a modulus of rupture of about 50,000 p.s.i. with a Young's modulus of $49 \times 10^6$. They have been dense, having densities of about 92% of their theoretical void-free density, as calculated by reference to the materials of their composition.

In several practical cutting tests they outperformed all other cutting tip bodies with which they were compared, as illustrated in the drawing made a part hereof. In the drawing, line $a$ of the graph represents results gained using bodies prepared as above; line $b$ represents results obtained using a body in all respects identical to the body of the foregoing example except that the nickel content of the body was all present as oxidized nickel or nickel oxide; line $c$, a commercially available titanium carbide body (probably containing cobalt metal as a bond); and line $d$, a commercially available body containing alpha alumina, cobalt aluminate and cobalt metal. Along the "Y" axis of the graph is listed the rate of cutting in surface feet per minute; along the "X" axis is listed the number of lineal feet of stock material removed by the cutting tool.

The test results set forth in the graph were obtained using, for each body tested, the same cutting tool tip signature (e.g., lead angle, negative rake, etc.) in the cutting of cylindrical hard alloy annealed steel bars. A cut depth of 0.020 inch and a feed along the bar of 0.017 inch per revolution were employed. The data recorded graphically in the drawing are necessarily generalized for purposes of illustration, but the various curve lines across the graph accurately set forth the relative performance relationship of the various bodies tested. Particularly worthy of note is the fact that the bodies of this invention, at both high and slow speeds of cutting, out-performed all other tool tips tested. As suggested by the graph, my bodies are effective in the removal of stock at a rate much faster than heretofore possible. In such cutting, chips of stock fall off at a very high temperature, but the cutting tool tip hereof remains relatively cool. The cutting of hard materials such as hardened tool steel known by the name "Kynite," which has heretofore usually been ground with an abrasive wheel, is effectively accomplished by using the bodies hereof.

My bodies may be formed in any shape as desired or necessary for cutting operations and the like, including abrading and grinding. Frequently peculiar shapes are required, and the body is held by cutting tool holder of a design or configuration permitting at least one edge of the body to be exposed for cutting operations. Formed in shapes as required and held in cutting tool holders of appropriate design, my bodies may be used, for example, to cut shafts from steel and other metal blanks, to grind enamel, to cut or abrade ceramic articles, masonry, as well as to perform other operations. Particles of the size and configuration of abrasive grain may even be formed and used for abrasive purposes.

The foregoing is offered as an illustrative but nonlimitative disclosure of my invention, as further set forth in the appended claims.

That which is claimed is:

1. A compact, dense, hard and tough, wear-resistant, sintered cermet body exhibiting improved cutting performance and consisting essentially of a ceramic matrix and a discontinuous metallic phase distributed throughout said ceramic matrix, said ceramic matrix comprising alpha alumina crystals in an amount accounting for at least about 80% of the weight of said body and said discontinuous metallic phase consisting essentially of nickel metal accounting for at least 0.1% and no more than about 7% of the weight of said body.

2. A compact, dense, hard and tough, wear-resistant, sintered cermet body exhibiting improved cutting performance and consisting essentially of a ceramic phase and a metallic phase, said ceramic phase consisting essentially of a major proportion of alpha alumina crystals and including a small amount of a nickel spinel of alumina having the general formula NiO·Al₂O₃, said metallic phase being discontinuous and consisting essentially of nickel metal accounting for at least 0.1% and no more than about 7% of the weight of said body, said amount of nickel metal being sufficient to toughen said body and render it resistant to rupture and cracking during use of said body as a cutting tip.

3. A compact, dense, hard and tough, wear-resistant, sintered cermet body adapted for use in cutting operations, said body consisting essentially of a ceramic phase and a metallic phase, said ceramic phase including alpha alumina crystals in an amount accounting for at least about 80% of the weight of said body, and said metallic phase consisting essentially of nickel metal in an amount between 0.4 and 4% of the weight of said body.

4. A compact, dense, hard and tough, wear-resistant, sintered cermet body adapted for use in cutting operations, said body comprising crystals of alpha alumina accounting for at least about 80% of the weight of said body, and materials which fill a large proportion of the interstices between said crystals, said materials consisting essentially of nickel spinel of alumina having the general formula NiO·Al₂O₃, at least one other spinel of alumina having the general formula RO·Al₂O₃, where R is a bivalent metal, and nickel metal as discontinuous particles throughout said body, said nickel metal being present in the amount of at least 0.1% and not in excess of about 7% of the weight of said body.

5. A compact, dense, hard and tough, wear-resistant, sintered cermet body exhibiting improved cutting performance and consisting essentially of a ceramic matrix and a discontinuous metallic phase, said ceramic matrix consisting essentially of crystals of alpha alumina accounting for at least 80% of the weight of said body, a nickel spinel of alumina having the general formula NiO·Al₂O₃, and a magnesium spinel of alumina having the general formula MgO·Al₂O₃, said metallic phase being present in said body as a discontinuous phase and including nickel metal in the amount of at least about 0.1% and up to about 7% of the weight of said body.

6. A process for making a compact, dense, hard and tough, wear-resistant, sintered cermet body, said process comprising pre-firing a pressed body having a composition including a nickel material constituting a source for nickel metal and at least 80% alpha alumina to a raised temperature above 600° C. and below cone 31 temperature conditions without maturation, and then firing said body to maturation at temperature conditions of at least about cone 31.

7. A process for making a compact, dense, hard and tough, wear-resistant, sintered cermet body, said process comprising pulverizing a mixture of inorganic raw materials into a small particle size, said mixture including at least about 80% alpha alumina and including a nickel material constituting a source for nickel metal, pressing said pulverized raw materials into a compact body, pre-firing said body in an oxidizing atmosphere to oxidize said nickel material at a raised temperature above 600° C. and below but near cone 31 temperature conditions, and then firing said body to maturation in a reducing atmosphere to reduce at least a portion of the nickel material oxidized in the pre-firing step and to shrink said body into a compact, dense, hard and tough cermet body, said firing to maturation being accomplished under temperature conditions of at least about cone 31.

8. A compact, dense, hard and tough, wear-resistant, sintered cermet body exhibiting improved cutting performance and consisting essentially of a ceramic matrix and a discontinuous metallic phase, said ceramic matrix consisting essentially of a nickel spinel of alumina having the general formula $NiO \cdot Al_2O_3$, a magnesium spinel of alumina having the general formula $MgO \cdot Al_2O_3$, and alpha alumina crystals accounting for at least 80% of the weight of said body, and said metallic phase consisting essentially of nickel metal in an amount accounting for at least about 0.4% and no more than about 4% of the weight of said body, said amount of nickel metal being sufficient to toughen said body and render it resistant to rupture and cracking during use of said body as a cutting tip.

9. A compact, dense, hard and tough, wear-resistant, sintered cermet body exhibiting improved cutting performance and consisting essentially of a ceramic matrix and a discontinuous metallic phase distributed throughout said ceramic matrix, said ceramic matrix comprising a small amount of a nickel spinel of alumina having the general formula $NiO \cdot Al_2O_3$, a magnesium spinel of alumina having the general formula $MgO \cdot Al_2O_3$, and alpha alumina crystals in an amount accounting for at least about 80% of the weight of said body, and said metallic phase consisting essentially of nickel metal in an amount accounting for at least about 0.1% and no more than about 7% of the weight of said body, the combined weight of nickel both as reduced nickel metal and as $Ni^{++}$ in said body being not more than up to about 10% of the weight of said body.

10. A compact, dense, hard and tough, wear-resistant, sintered cermet body exhibiting improved cutting performance and consisting essentially of a ceramic phase and a discontinuous metallic phase, said ceramic phase consisting essentially of a small amount of nickel spinel of alumina having the general formula $NiO \cdot Al_2O_3$, a magnesium spinel of alumina having the general formula $MgO \cdot Al_2O_3$, and alpha alumina crystals in an amount accounting for at least about 80% of the weight of said body, and said metallic phase consisting essentially of nickel metal in an amount between 0.4 and 4% of the weight of said body, the combined weight of nickel both as reduced nickel metal and as $Ni^{++}$ in said body being not more than up to about 10% of the weight of said body.

11. A process for making a compact, dense, hard and tough, wear-resistant, sintered cermet body, said process comprising pulverizing a mixture of inorganic raw materials comprising at least about 80% by weight alpha alumina, a magnesium spinel of alumina having the general formula $MgO \cdot Al_2O_3$, and nickel metal in an amount not more than up to about 10% of the weight of said mixture, pressing said pulverized raw materials into a compact body, pre-firing said body without maturation in an oxidizing atmosphere at a temperature at least above 600° C. and below but near cone 31 temperature conditions, whereby the nickel of said body is oxidized in the presence of the other constituents thereof, and then firing said body to maturation in a reducing atmosphere under temperature conditions of at least about cone 31 to shrink said body and to form a compact, dense, hard and tough cermet body containing nickel metal up to approximately 7% by weight.

12. Process comprising pulverizing a mixture of inorganic raw materials comprising at least about 80% by weight alpha alumina, and nickel metal in an amount up to about 10% of the weight of said mixture, pressing said pulverized raw materials into a compact body, pre-firing said body without maturation in an oxidizing atmosphere at a temperature at least above about 600° C. and below cone 31 temperature conditions, whereby the nickel of said body is oxidized, and then firing said body to maturation in a reducing atmosphere at a temperature of at least about 1680° C. for a time sufficient to reduce at least a portion of the nickel oxide of said pre-fired body and shrink said body into a compact, dense, hard and tough cermet body.

References Cited in the file of this patent
UNITED STATES PATENTS

| | | |
|---|---|---|
| 2,404,598 | Sachse | July 23, 1946 |
| 2,431,660 | Gaudenzi | Nov. 25, 1947 |
| 2,783,530 | Conant | Mar. 5, 1957 |

OTHER REFERENCES

Iron Age, January 1, 1948, lines 54–62, page 204; lines 14–19, p. 205.